United States Patent
Yamada et al.

(10) Patent No.: US 8,438,350 B2
(45) Date of Patent: May 7, 2013

(54) STORAGE APPARATUS AND STORAGE CONTROL APPARATUS

(75) Inventors: Hidenori Yamada, Kawasaki (JP); Shinichi Nishizono, Kawasaki (JP); Koji Uchida, Kawasaki (JP); Akihito Kobayashi, Kawasaki (JP); Katsuhiko Nagashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 12/633,864

(22) Filed: Dec. 9, 2009

(65) Prior Publication Data

US 2010/0217932 A1 Aug. 26, 2010

(30) Foreign Application Priority Data

Feb. 20, 2009 (JP) ................. 2009-037813

(51) Int. Cl.
*G06F 12/00* (2006.01)

(52) U.S. Cl.
USPC .......................................... 711/162; 711/114

(58) Field of Classification Search .................. 711/162, 711/114
See application file for complete search history.

(56) References Cited

U.S. PATENT DOCUMENTS

| | | | |
|---|---|---|---|
| 6,704,885 B1 * | 3/2004 | Salas-Meza et al. | 714/6.3 |
| 2004/0268069 A1 | 12/2004 | Satoyama et al. | |
| 2006/0212671 A1 * | 9/2006 | Todd | 711/165 |
| 2007/0233980 A1 * | 10/2007 | Cox et al. | 711/162 |
| 2008/0140965 A1 * | 6/2008 | Martin et al. | 711/162 |
| 2009/0313428 A1 * | 12/2009 | De Jong | 711/114 |

FOREIGN PATENT DOCUMENTS

| | | |
|---|---|---|
| JP | 2000-137582 | 5/2000 |
| JP | 2003-6016 | 1/2003 |
| JP | 2005-18185 | 1/2005 |
| JP | 2007-213272 | 8/2007 |

OTHER PUBLICATIONS

Japanese Office Action issued Sep. 18, 2012 in corresponding Japanese Patent Application No. 2009-037813.

* cited by examiner

*Primary Examiner* — Hashem Farrokh
(74) *Attorney, Agent, or Firm* — Staas & Halsey LLP

(57) ABSTRACT

A storage apparatus includes a copy control unit for managing a copy session for copying an copy source data area in at least one of the first to the Mth copy source disk groups to an copy destination data area in a corresponding copy destination disk group, setting a first to an Mth copy session groups, each of the copy session groups including one or more copy sessions from the ith copy source disk group to the ith copy destination disk group as the copy session, and performing repeatedly a selection operation for cyclically selecting a copy session from each of the first to the Mth copy session groups in a predetermined sequence and a control operation for cyclically executing copy processing on a predetermined copy processing unit basis for the M copy sessions selected by the selection operation in a predetermined sequence for a prescribed number of times.

15 Claims, 12 Drawing Sheets

FIG. 4A

| 121-0 |
|---|
| THE PRESCRIBED NUMBER OF TIMES |
| THE NUMBER OF COPY EXECUTION TIMES |
| COPY EXECUTING SESSION NO. |
| TARGET COPY SESSION #0 |
| TARGET COPY SESSION #1 |
| TARGET COPY SESSION #2 |

FIG. 4B

| 121-1 |
|---|
| THE PRESCRIBED NUMBER OF TIMES |
| THE NUMBER OF COPY EXECUTION TIMES |
| COPY EXECUTING SESSION NO. |
| TARGET COPY SESSION #3 |
| TARGET COPY SESSION #4 |

FIG. 4C

| 121-2 |
|---|
| THE PRESCRIBED NUMBER OF TIMES |
| THE NUMBER OF COPY EXECUTION TIMES |
| COPY EXECUTING SESSION NO. |
| TARGET COPY SESSION #5 |
| TARGET COPY SESSION #6 |
| TARGET COPY SESSION #7 |

FIG. 5

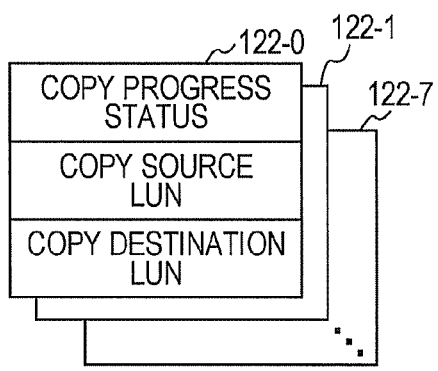

FIG. 11A

| | |
|---|---|
| SESSION #0 | [A001] |
| SESSION #1 | |
| SESSION #2 | |
| SESSION #3 | |
| SESSION #4 | |
| SESSION #5 | |
| SESSION #6 | |
| SESSION #7 | |

FIG. 11B

| | |
|---|---|
| SESSION #0 | [A001] |
| SESSION #1 | |
| SESSION #2 | |
| SESSION #3 | [A101] |
| SESSION #4 | |
| SESSION #5 | |
| SESSION #6 | |
| SESSION #7 | |

FIG. 11C

| | |
|---|---|
| SESSION #0 | [A001] |
| SESSION #1 | |
| SESSION #2 | |
| SESSION #3 | [A101] |
| SESSION #4 | |
| SESSION #5 | [A201] |
| SESSION #6 | |
| SESSION #7 | |

FIG. 11D

| | |
|---|---|
| SESSION #0 | [A001] [A002] |
| SESSION #1 | |
| SESSION #2 | |
| SESSION #3 | [A101] |
| SESSION #4 | |
| SESSION #5 | [A201] |
| SESSION #6 | |
| SESSION #7 | |

FIG. 11E

| | |
|---|---|
| SESSION #0 | [A001] [A002] |
| SESSION #1 | |
| SESSION #2 | |
| SESSION #3 | [A101][A102] |
| SESSION #4 | |
| SESSION #5 | [A201] |
| SESSION #6 | |
| SESSION #7 | |

FIG. 11F

| | |
|---|---|
| SESSION #0 | [A001] [A002] |
| SESSION #1 | |
| SESSION #2 | |
| SESSION #3 | [A101] [A102] |
| SESSION #4 | |
| SESSION #5 | [A201] [A202] |
| SESSION #6 | |
| SESSION #7 | |

FIG. 11G

| | |
|---|---|
| SESSION #0 | [A001]···[A016] |
| SESSION #1 | |
| SESSION #2 | |
| SESSION #3 | [A101]···[A116] |
| SESSION #4 | |
| SESSION #5 | [A201]···[A216] |
| SESSION #6 | |
| SESSION #7 | |

FIG. 11H

| | |
|---|---|
| SESSION #0 | [A001]···[A016] |
| SESSION #1 | [B001] |
| SESSION #2 | |
| SESSION #3 | [A101]···[A116] |
| SESSION #4 | |
| SESSION #5 | [A201]···[A216] |
| SESSION #6 | |
| SESSION #7 | |

FIG. 11I

| | |
|---|---|
| SESSION #0 | [A001]···[A016] |
| SESSION #1 | [B001] |
| SESSION #2 | |
| SESSION #3 | [A101]···[A116] |
| SESSION #4 | [B101] |
| SESSION #5 | [A201]···[A216] |
| SESSION #6 | |
| SESSION #7 | |

FIG. 11J

| | |
|---|---|
| SESSION #0 | [A001]···[A016] |
| SESSION #1 | [B001] |
| SESSION #2 | |
| SESSION #3 | [A101]···[A116] |
| SESSION #4 | [B101] |
| SESSION #5 | [A201]···[A216] |
| SESSION #6 | [B201] |
| SESSION #7 | |

FIG. 11K

| | |
|---|---|
| SESSION #0 | [A001]···[A016] |
| SESSION #1 | [B001] [B002] |
| SESSION #2 | |
| SESSION #3 | [A101]···[A116] |
| SESSION #4 | [B101] |
| SESSION #5 | [A201]···[A216] |
| SESSION #6 | [B201] |
| SESSION #7 | |

FIG. 11L

| | |
|---|---|
| SESSION #0 | [A001]···[A016] |
| SESSION #1 | [B001] [B002] |
| SESSION #2 | |
| SESSION #3 | [A101]···[A116] |
| SESSION #4 | [B101] [B102] |
| SESSION #5 | [A201]···[A216] |
| SESSION #6 | [B201] |
| SESSION #7 | |

FIG. 11M

| | |
|---|---|
| SESSION #0 | [A001]...[A016] |
| SESSION #1 | [B001] [B002] |
| SESSION #2 | |
| SESSION #3 | [A101]...[A116] |
| SESSION #4 | [B101] [B102] |
| SESSION #5 | [A201]...[A216] |
| SESSION #6 | [B201] [B202] |
| SESSION #7 | |

FIG. 11N

| | |
|---|---|
| SESSION #0 | [A001]...[A016] |
| SESSION #1 | [B001]...[B016] |
| SESSION #2 | |
| SESSION #3 | [A101]...[A116] |
| SESSION #4 | [B101]...[B116] |
| SESSION #5 | [A201]...[A216] |
| SESSION #6 | [B201]...[B216] |
| SESSION #7 | |

FIG. 11O

| | |
|---|---|
| SESSION #0 | [A001]...[A016] |
| SESSION #1 | [B001]...[B016] |
| SESSION #2 | [C001] |
| SESSION #3 | [A101]...[A116] |
| SESSION #4 | [B101]...[B116] |
| SESSION #5 | [A201]...[A216] |
| SESSION #6 | [B201]...[B216] |
| SESSION #7 | |

FIG. 11P

| | |
|---|---|
| SESSION #0 | [A001]...[A016] |
| SESSION #1 | [B001]...[B016] |
| SESSION #2 | [C001] |
| SESSION #3 | [A101]...[A116] [A117] |
| SESSION #4 | [B101]...[B116] |
| SESSION #5 | [A201]...[A216] |
| SESSION #6 | [B201]...[B216] |
| SESSION #7 | |

FIG. 11Q

| | |
|---|---|
| SESSION #0 | [A001]...[A016] |
| SESSION #1 | [B001]...[B016] |
| SESSION #2 | [C001] |
| SESSION #3 | [A101]...[A116] [A117] |
| SESSION #4 | [B101]...[B116] |
| SESSION #5 | [A201]...[A216] |
| SESSION #6 | [B201]...[B216] |
| SESSION #7 | [C201] |

FIG. 11R

| | |
|---|---|
| SESSION #0 | [A001]...[A016] |
| SESSION #1 | [B001]...[B016] |
| SESSION #2 | [C001]...[C016] |
| SESSION #3 | [A101]...[A116] [A117]...[A132] |
| SESSION #4 | [B101]...[B116] |
| SESSION #5 | [A201]...[A216] |
| SESSION #6 | [B201]...[B216] |
| SESSION #7 | [C201]...[C216] |

FIG. 11S

| | |
|---|---|
| SESSION #0 | [A001]...[A016] [A017]...[A032] |
| SESSION #1 | [B001]...[B016] |
| SESSION #2 | [C001]...[C016] |
| SESSION #3 | [A101]...[A116] [A117]...[A132] |
| SESSION #4 | [B101]...[B116] [B117]...[B132] |
| SESSION #5 | [A201]...[A216] [A217]...[A232] |
| SESSION #6 | [B201]...[B216] |
| SESSION #7 | [C201]...[C216] |

FIG. 13    RELATED ART
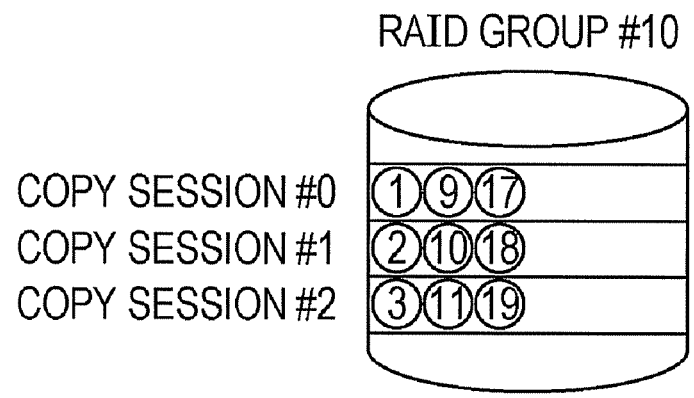
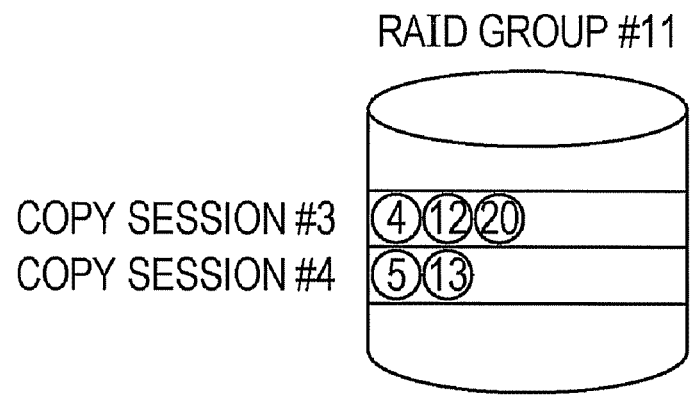
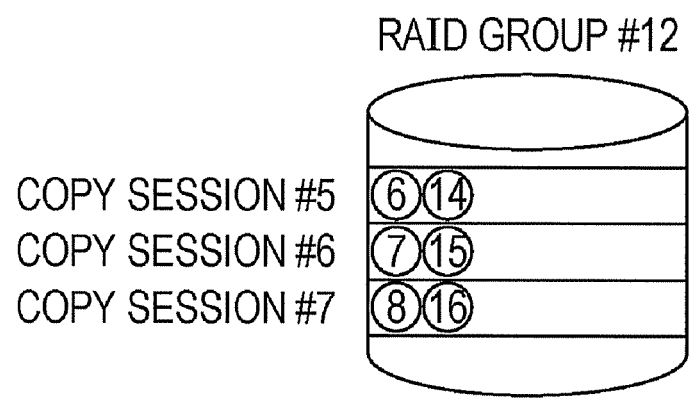

STORAGE APPARATUS AND STORAGE CONTROL APPARATUS

CROSS-REFERENCE TO RELATED APPLICATIONS

This application is based upon and claims the benefit of priority of the prior Japanese Patent Application No. 2009-37813, filed on Feb. 20, 2009, the entire contents of which are incorporated herein by reference.

FIELD

The embodiment discussed herein is related to a storage apparatus and a storage control apparatus.

BACKGROUND

Generally, in a storage apparatus using a physical disk such as a magnetic disk, an optical magnetic disk, an optical disk, and the like, a logical volume is formed on the physical disk in accordance with a request form a host such as a data processing apparatus or the like. In order to back up data in the formed logical volume, generally, the logical volume is copied to a physical disk (copy destination) different from the physical disk (copy source) holding the logical volume.

In such a copy of logical volume, all the data in the logical volume is transmitted to be written from copy source to copy destination sequentially from the top of the data, a predetermined copy processing unit at a time (for example, a data block of 256 Kbytes at a time), and such an operation is called "initial copy". This initial copy may be set for a plurality of logical volumes and performed at the same time. Hereinafter, conventional copy processing executed in such a case will be described with reference to FIGS. 12 and 13.

FIG. 12 is an illustration schematically illustrating an example in which a plurality of copy sessions conflict with each other in a general storage apparatus. The storage apparatus illustrated in FIG. 12 includes three copy source RAID (Redundant Arrays of Inexpensive Disk) groups #0, #1, #2, and three copy destination RAID groups #10, #11, #12 respectively corresponding to the RAID groups #0 to #2.

Each RAID group is an assembly of a plurality of disks in which RAID 1, RAID 5, or the like is configured, and operates as a virtual disk. The RAID groups #0, #1, #10, #11 are used in a system A for a predetermined use, and the RAID groups #2, #12 are used in a system B for another use different from the predetermined use.

In such a storage apparatus (RAID apparatus), in the example illustrated in FIG. 12, eight copy sessions #0 to #7 are set. Here, the copy session is a management unit for managing a copy source and a copy destination, more specifically, the copy session is a management unit when copying a logical volume as a copy source data area to a logical volume as a copy destination data area. Each logical volume is identified by LUN (Logical Unit Number).

For example, the copy session #0 is a session for copying the copy source logical volume of LUN=01 to the copy destination logical volume of LUN=101. Also, the copy session #1 is a session for copying the copy source logical volume of LUN=02 to the copy destination logical volume of LUN=102. Further, the copy session #2 is a session for copying the copy source logical volume of LUN=03 to the copy destination logical volume of LUN=103. All of the three copy sessions #0 to #2 are copy sessions from the RAID group #0 to the RAID group #10.

In a similar way, the copy session #3 is a session for copying the copy source logical volume of LUN=11 to the copy destination logical volume of LUN=111. The copy session #4 is a session for copying the copy source logical volume of LUN=12 to the copy destination logical volume of LUN=112. All of the two copy sessions #3, #4 are copy sessions from the RAID group #1 to the RAID group #11.

The copy session #5 is a session for copying the copy source logical volume of LUN=21 to the copy destination logical volume of LUN=121. The copy session #6 is a session for copying the copy source logical volume of LUN=22 to the copy destination logical volume of LUN=122. Further, the copy session #7 is a session for copying the copy source logical volume of LUN=23 to the copy destination logical volume of LUN=123. All of the three copy sessions #5 to #7 are copy sessions from the RAID group #2 to the RAID group #12.

Conventionally, the initial copy based on the 8 copy sessions #0 to #7 set as illustrated in FIG. 12 is performed at the same time as described below. FIG. 13 is an illustration illustrating a conventional initial copy procedure in the storage apparatus illustrated in FIG. 12. For example, as illustrated in FIG. 13, data of a predetermined copy processing unit (for example, a data block of 256 Kbytes) is sequentially transmitted to be written from the copy source to the copy destination, in a cyclic sequence of the copy session #0->#1->#2->#3->#4->#5->#6->#7->#0->#1 . . . ->#7->#0->#1-> . . . At this time, all the data in each copy source logical volume is transmitted to be written sequentially from the top of the data to the copy destination logical volume a predetermined copy processing unit at a time.

In FIG. 13, circled numbers illustrated the sequence of the copy processing, and a state in which the 20th copy processing has been executed is illustrated. In FIG. 13, the data corresponding to the circled numbers 1, 9, 17, . . . in the copy destination logical volume of LUN=101 is copied from a continuous area in the copy source logical volume of LUN=01. In a similar way, the data corresponding to the circled numbers in the other copy destination logical volumes is copied from a continuous area in each corresponding copy source logical volume.

Such copy processing is repeated until all the data in the copy source logical volume of each copy session is copied to the copy destination logical volume. In this way, a plurality of RAID groups can be equally used in the copy processing, so that throughput of the initial copy is expected to improve in the entire apparatus. (refer to Japanese Laid-open Patent Publication No. 2007-213272)

By the way, generally speaking, a physical disk included in each RAID group is a mechanical device constituted by a disk-shaped recording medium called "platter" and a head. The physical disk needs to mechanically move the head to a storing position of access target data on the disk-shaped recording medium, differently from, for example, DRAM (Dynamic Random Access Memory) which stores information by a semiconductor switch operation without a mechanical operation. Such a mechanical movement of the head is an operation taking an extremely long time.

When the copy processing is cyclically executed a predetermined copy processing unit at a time for a plurality of copy sessions as described above, data accesses are performed to distant (dispersed) addresses in a physical disk in the same RAID group. Therefore, every time the copy processing of a predetermined copy processing unit is executed, the head has to be moved to a distant address, so that an amount of the physical movement of the head increases, and only a small performance can be attained, which is far from the maximum performance which the physical disk can originally realize.

Here, the copy source RAID group is used for a normal operation, and the copy destination RAID group is used for a backup. Therefore, generally speaking, more high-speed/high-performance/expensive RAID group is used for the copy source RAID group compared with the copy destination RAID group. To put it the other way around, more low-speed/low-performance/inexpensive RAID group is used for the copy destination RAID group compared with the copy source RAID group. Therefore, in many cases, the decrease in performance due to the increase of head movement amount as described above is significant in the copy destination RAID group.

On the other hand, there are problems as described below when considering the copy source RAID group. When performing copy processing, the copy target data is developed from each copy source RAID group to a cache memory on a predetermined copy processing unit basis, and the data developed in the cache memory on the predetermined processing unit basis is transmitted to the copy destination RAID group. At this time, since, when the data of the predetermined copy processing units is continuously developed from a continuous area, the data which should be developed next can be predicted, a pre-read (prefetch) is performed before a read request is received, and an operation in which the data that may be the copy target is developed in advance is generally performed.

However, when the copy processing is cyclically executed a predetermined copy processing unit at a time for a plurality of copy sessions as described above, data are read from distant (dispersed) addresses in a physical disk in the same RAID group. Therefore, a pre-read (prefetch) from the copy source RAID group to the cache memory cannot be performed at all, so that read performance cannot be improved.

SUMMARY

According to an aspect of the invention, a storage apparatus includes a first to an Mth (M is an integer of two or more) copy source disk groups, each of the copy source disk groups including one or more copy source physical disks, a first to an Mth copy destination disk groups respectively corresponding to the first to the Mth copy source disk groups, each of the copy destination disk groups including one or more copy destination physical disks, and a copy control unit. The copy control unit to control the storage control apparatus according to a process includes managing a copy session for copying an copy source data area in at least one of the first to the Mth copy source disk groups to an copy destination data area in a corresponding copy destination disk group, setting a first to an Mth copy session groups, each of the copy session groups including one or more copy sessions from the ith (i=1, 2, ..., M) copy source disk group to the ith copy destination disk group as the copy session, and performing repeatedly a selection operation for cyclically selecting a copy session from each of the first to the Mth copy session groups in a predetermined sequence and a control operation for cyclically executing copy processing on a predetermined copy processing unit basis for the M copy sessions selected by the selection operation in a predetermined sequence for a prescribed number of times.

The object and advantages of the invention will be realized and attained by unit of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 4A to 4C are illustrations illustrating management contents of a RAID group management table of the embodiment.

FIG. 5 is an illustration illustrating management contents of a copy session management table of the embodiment.

FIGS. 11A to 11S are illustrations illustrating the copy statuses of copying data to each copy destination logical volume corresponding to FIG. 9 for illustrating the copy processing of the embodiment.

FIG. 13 is an illustration illustrating a conventional initial copy procedure in the storage apparatus illustrated in FIG. 12.

DESCRIPTION OF EMBODIMENT

Hereinafter, an embodiment of the present technique will be described with reference to the drawings.

[1] Configuration of the Embodiment

Figure 1:
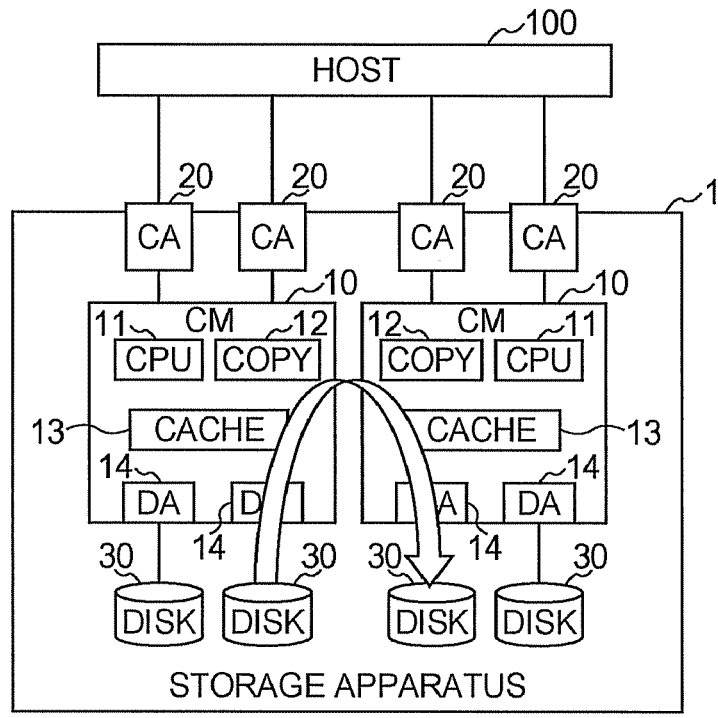
FIG. 1 is a block diagram illustrating an entire configuration of a storage apparatus of an embodiment.

First, an entire configuration of a storage apparatus 1 of the embodiment will be described with reference to FIG. 1. FIG. 1 is a block diagram illustrating the entire configuration of the storage apparatus 1.

The storage apparatus 1 of the embodiment is a RAID system using a physical disk such as a magnetic disk, an optical magnetic disk, and an optical disk. As illustrated in FIG. 1, the storage apparatus 1 is accessed from a host computer (higher-level apparatus; HOST) 100. The storage apparatus 1 includes a plurality of CAs (Channel Adapters) 20 for functioning as interface control units controlling interface with the HOST 100, a plurality of CMs (Controller Modules; Storage control apparatuses) 20, and a plurality of storages (Disks) 30 controlled by the CMs 10.

The storage apparatus 1 illustrated in FIG. 1 includes four CAs 20, two CMs 10, and four storages 30. In FIG. 1, each CM 10 receives an I/O (input/output) request from the HOST 100 via the two CAs 20, and manages the two storages 30.

Also in the embodiment, in a similar way as the example described above with reference to FIG. 12, at least two of the four storages 30 are assumed to include three copy source RAID groups #0 to #2, and three copy destination RAID groups #10 to #12 respectively corresponding to the RAID groups #0 to #2. Each RAID group (disk group) is an assembly of a plurality of disks in which RAID 1 or RAID 5 is configured, and performs as a virtual disk. Specifically, the embodiment includes a first to a third copy source RAID groups #0 to #2 each of which includes one or more copy source physical disks, and a first to a third copy destination RAID groups #10 to #12 each of which includes one or more copy destination physical disks. The RAID groups #0, #1, #10, #11 are used in the system A for a predetermined use, and the RAID groups #2, #12 are used in the system B for another use different from the predetermined use Further, also in the embodiment, eight copy sessions #0 to #7 are assumed to be set, in the same way as the example described above with reference to FIG. 12. A first to a third copy session groups, each of which includes one or more copy sessions from the ith (i=1, 2, 3) copy source disk group to the ith copy destination disk group, are set. Specifically, the first copy session group includes three copy sessions #0 to #2, the second copy session group includes two copy sessions #3 and #4, and the third copy session group includes three copy sessions #5 to #7.

Also here, as described above, the copy session is a management unit for managing a copy source and a copy destination, more specifically, the copy session is a management unit when copying a logical volume as a copy source data area to a logical volume as a copy destination data area. Each logical volume is identified by LUN.

Each CM 10 is arranged between the HOST (CA 20) and the two storages 30, and performs an access control to each storage 30 in accordance with an I/O request from the HOST 100. Also, each CM 10 performs a function for controlling the above described copy session, in other words, initial copy processing for a plurality of logical volumes.

Figure 2:
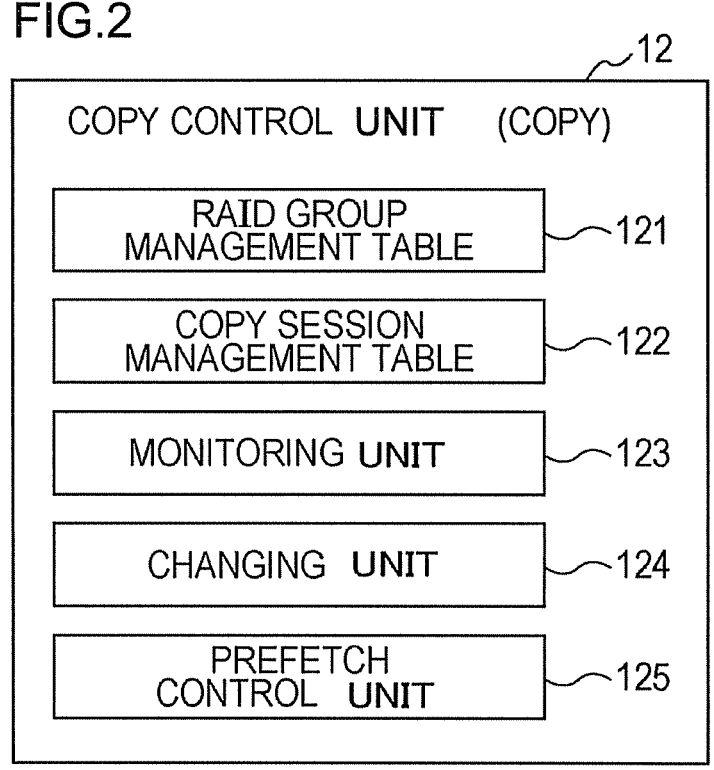
FIG. 2 is a block diagram illustrating a functional configuration of a copy control unit in a storage control apparatus of the embodiment which is applied to the storage apparatus illustrated in FIG. 1.

Next, a functional configuration of each CM 10 will be described with reference to FIGS. 1 and 2. FIG. 2 is a block diagram illustrating a functional configuration of a copy control unit 12 in each CM 10. As illustrated in FIG. 1, each CM 10 includes a CPU (Central Processing Unit) 11, a copy control unit (copy) 12, a cache memory (Cache) 13, and DAs (Disk Adapters) 14.

Here, the CPU (processing unit) 11 executes a predetermined application program or the like to realize the copy control unit 12 and the cache memory 13 as firmware. The DA 13 is provided corresponding to each storage 30, and functions as an interface control unit for interfacing with the storage 30. In FIG. 1, although the CA 20 is illustrated outside of the CM 10, the CA 20 may be included in the CM 10.

The cache memory 14 stores user data and control information, and temporarily holds the I/O request target data received from the HOST 100 via the CA 20. In the cache memory 14 of the copy source CM 10, copy target data read from a copy source storage 30 is developed during the initial copy. On the other hand, in the cache memory 14 of the copy destination CM 10, the copy target data transmitted from the copy source CM 10 is developed, and the copy target data developed in the cache memory 14 is written into a copy destination storage 30 by the copy control unit 12.

The copy control unit 12 manages copy source/copy destination control information and instructs transmission, and especially, in this embodiment, performs a function of managing the above described copy session. The copy control unit 12 includes, as illustrated in FIG. 2, a RAID group management table 121, a copy session management table 122, a monitoring unit 123, a changing unit 124, and a prefetch control unit 125. The copy control unit 12 sets the RAID group management table 121 and the copy session management table 122.

The copy control unit 12 includes a function for repeatedly executing a selection operation based on the RAID group management table 121 and a control operation based on the copy session management table 122. Here, the selection operation is an operation for cyclically selecting a copy session from each of the first to the third copy session groups in a predetermined sequence. The control operation is an operation for cyclically executing copy processing on a predetermined copy processing unit basis (for example, a data block of 256 Kbytes at a time) for the three sessions selected by the selection operation in a predetermined sequence for the prescribed number of times. The detailed operation of the basic copy processing function of the copy control unit 12 will be described below with reference to FIGS. 6, 9, and 11.

Figure 3:
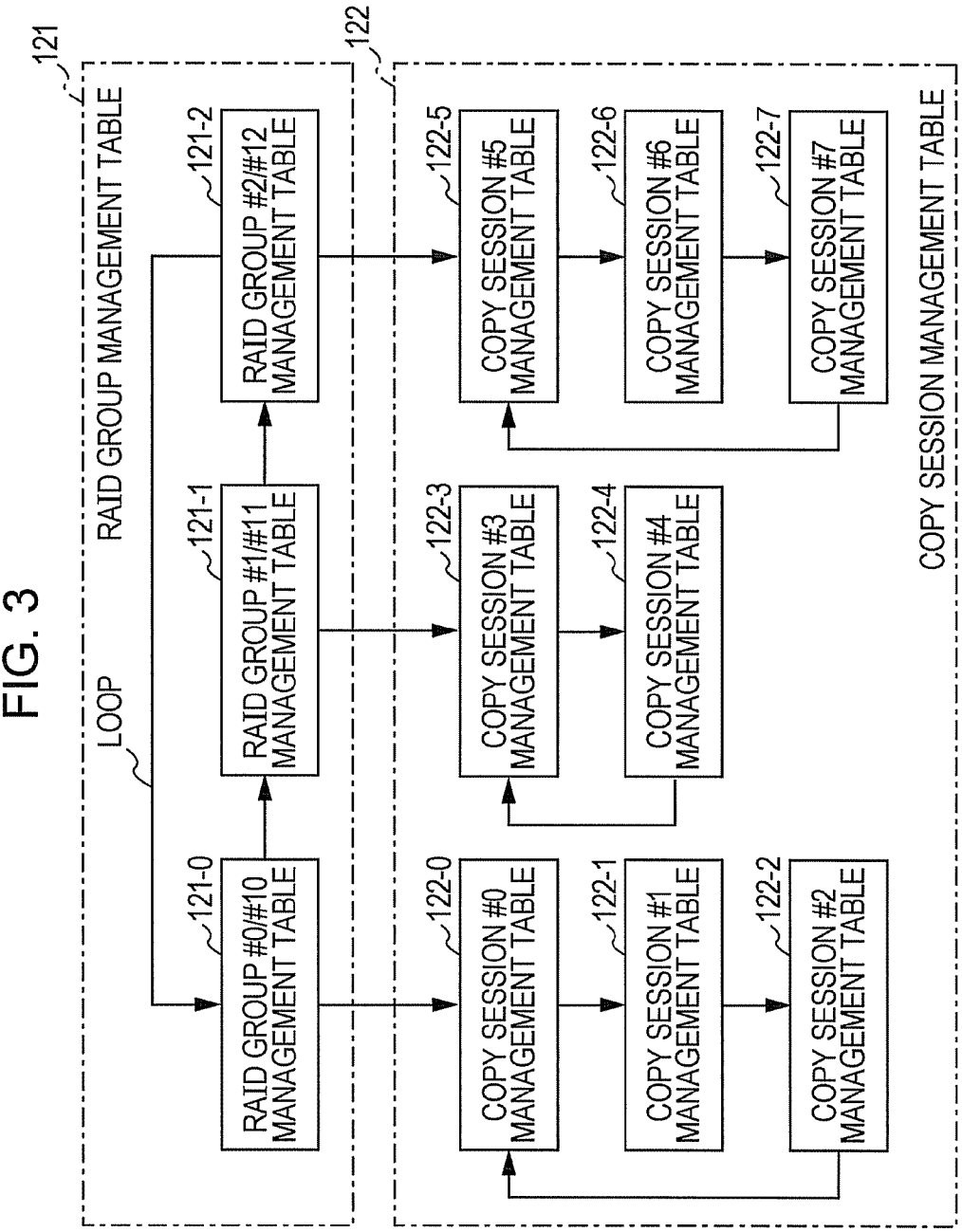
FIG. 3 is a block diagram illustrating a structure of management tables of the embodiment.

Here, the RAID group management table 121 and the copy session management table 122 have structures as illustrated in FIG. 3, and hold management contents as illustrated in FIG. 4 and FIG. 5 respectively. FIG. 3 is a block diagram illustrating the structure of the management tables 121 and 122 of the embodiment. FIGS. 4A to 4C are illustrations illustrating management contents of three management tables 121-0 to 121-2 included in the RAID group management table 121 of the embodiment. Further, FIG. 5 is an illustration illustrating management contents of management tables 122-0 to 122-7 included in the copy session management table 122 of the embodiment.

In this embodiment, the RAID group management table (disk group management table) 121 includes management tables 121-0 to 121-2 for the RAID groups #0/#10 to #2/#12, each of which corresponds to the first to the third copy session groups respectively. The management table 121-0 for the RAID groups #0/#10 corresponds to copy sessions #0 to #2 included in the first copy session group. As illustrated in FIG. 4(A), the management table 121-0 manages the information (11) to (14) below for the copy source RAID group #0 and the copy destination RAID group #10.

(11) Information for identifying a copy session in which copy processing is being executed (copy executing session No.). (12) The number of copy processing execution times in the copy session. (13) A value for determining the number of copy processing repetition times (the prescribed number of times; default value is 16 for example). (14) Copy session No. of management target (here, #0 to #2).

The management table 121-1 for the RAID groups #1/#11 corresponds to copy sessions #3 and #4 included in the second copy session group. As illustrated in FIG. 4(B), the management table 121-1 manages the information (21) to (24) below for the copy source RAID group #1 and the copy destination RAID group #11.

(21) Information for identifying a copy session in which copy processing is being executed (copy executing session No.). (22) The number of copy processing execution times in the copy session. (23) A value for determining the number of copy processing repetition times (the prescribed number of times; default value is 16 for example). (24) Copy session No. of management target (here, #3 and #4).

The management table 121-2 for the RAID groups #2/#12 corresponds to copy sessions #5 to #7 included in the third copy session group. As illustrated in FIG. 4(C), the management table 121-2 manages the information (31) to (34) below for the copy source RAID group #2 and the copy destination RAID group #12.

(31) Information for identifying a copy session in which copy processing is being executed (copy executing session No.). (32) The number of copy processing execution times in the copy session. (33) A value for determining the number of copy processing repetition times (the prescribed number of times; default value is 16 for example). (34) Copy session No. of management target (here, #5 to #7).

In this embodiment, the copy session management table 122 includes management tables 122-0 to 122-7 for the copy sessions #0 to #7, each of which corresponds to the eight copy sessions #0 to #7 respectively. As illustrated in FIG. 3, the management tables 122-0 to 122-2 for the copy sessions #0 to #2 belonged to the first copy session group are under control of the management table 121-0 for the RAID groups #0/#10. In the same way, the management tables 122-3 and 122-4 for the copy sessions #3 to #4 belonged to the second copy session group are under control of the management table 121-1 for the RAID groups #1/#11. Also, the management tables 122-5 to 122-7 for the copy sessions #5 to #7 belonged to the third copy session group are under control of the management table 121-2 for the RAID groups #2/#12.

As illustrated in FIG. 5, each of the management tables 122-0 to 122-7 for the copy sessions #0 to #7 manages the information (41) to (43) below for the copy sessions #0 to #7 respectively. (41) Copy source LUN for identifying a copy source logical volume (a copy source data area). (42) Copy destination LUN for identifying a copy destination logical volume (a copy destination data area). (43) Progress status of the copy processing in the copy session (information related to a point to which the copy processing has been completed from the top of the logical volume).

On the other hand, the copy control unit 12 of the embodiment further includes a changing function for dynamically changing the number of copy processing repetition times (the prescribed number of times), and a prefetch control function based on a scheduling result of the copy processing (the prescribed number of times), in addition to the above described basic copy processing function. Therefore, the copy control unit 12 includes the monitoring unit 123 and the changing unit 124 to realize the above changing function, and the prefetch control unit 125 to realize the above prefetch control function.

The monitoring unit 123 monitors a write response time (a response time) of the copy destination RAID groups #10 to #12 resulting from the copy processing by the above described control operation for each copy session. More specifically, the monitoring unit 123 monitors and detects the time, as the response time, in which the copy target data is written from the cache memory 13 to a target logical volume in the storage 30 when the copy processing is executed in the copy destination RAID groups #10 to #12.

The changing unit 124 dynamically changes the number of copy processing repetition times (the prescribed number of times) in each copy session depending on the response time monitored by the monitoring unit 123. More specifically, the changing unit 124 decreases the prescribed number of times when the response time is smaller than a first predetermined value, and on the other hand increases the prescribed number of times when the response time is greater than a second predetermined value (>=the first predetermined value). The changing unit 124 causes the copy processing to skip for a predetermined time period for a copy session whose response time does not improve even when the prescribed number of times is increased. As the prescribed number of times, for example, any one of 4, 8, 16, 32, and 64 is set to be selectable, and the default value is set to 16.

When the response time=the first predetermined value=the second predetermined value, or the response time is between the first predetermined value and the second predetermined value, the changing unit 124 keeps the current prescribed number of times. When the response time is smaller than the first predetermined value and copy processing performance is good, the changing unit 124 decreases the prescribed number of times by one step, determining that the RAID group on which the copy session is performed has enough performance. For example, the prescribed number of times is changed from 16 to 8. If the response time is smaller than the first predetermined value even when the changing unit 124 decreases the prescribed number of times to 4, the prescribed number of times is kept at 4.

On the other hand, when the response time is greater than the second predetermined value and copy processing performance is bad, the changing unit 124 increases the prescribed number of times by one step in order to improve the copy processing performance by increasing a data read/write amount from/to a continuous area or neighboring areas on the same physical disk. For example, the prescribed number of times is changed from 16 to 32. If the response time is not smaller than the second predetermined value even when the changing unit 124 increases the prescribed number of times to 64, the changing unit 124 causes the copy processing of the copy session to skip for a predetermined time period. During the skip period, the data held in the cache memory 13 is written to the copy destination RAID groups #10 to #12.

Figure 7:
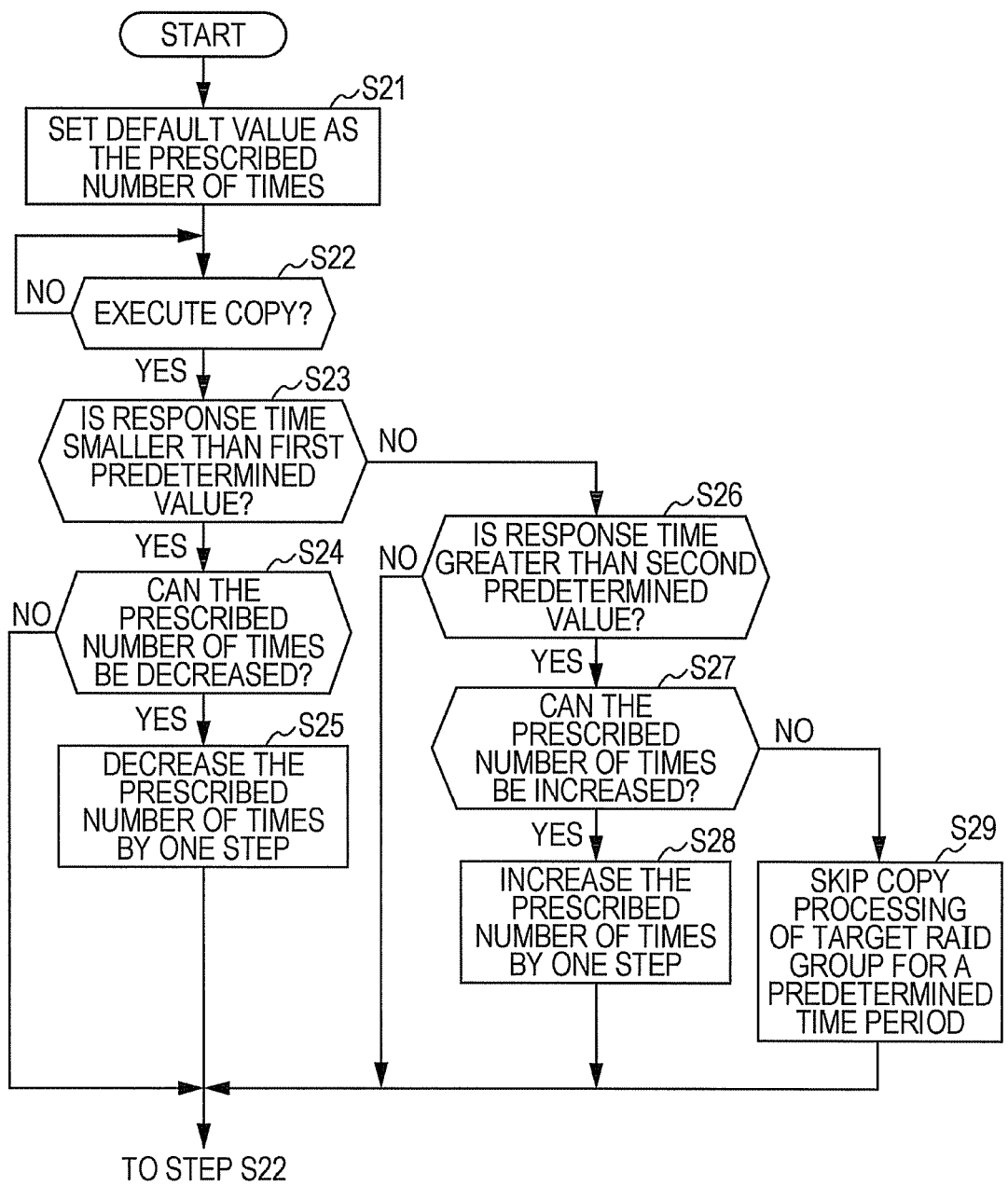
FIG. 7 is a flowchart for illustrating a changing function (procedure for changing a predetermined number of execution times of copy processing) of the embodiment.

The detailed operation of the above described changing function of the copy control unit 12 will be described below with reference to FIGS. 7 and 10. Timing of changing the prescribed number of times by the changing function is not particularly limited. For example, every time the copy processing is executed in each copy session, the response time may be detected and the changing may be performed on the basis of the response time. Also, the changing may be performed on the basis of the response time after the copy processing in each copy session is repeated a predetermined number of times.

Here, as described above, the copy source RAID group is used for a normal operation, and the copy destination RAID group is used for a backup. Therefore, generally speaking, more high-speed/high-performance/expensive RAID group is used for the copy source RAID group compared with the copy destination RAID group. To put it the other way around, more low-speed/low-performance/inexpensive RAID group is used for the copy destination RAID group compared with the copy source RAID group. Therefore, in many cases, the decrease in performance due to the increase of head movement amount is significant in the copy destination RAID group. Considering such a situation, in this embodiment, the response time, which is a change criterion of the changing unit 124, is monitored and detected on the side of copy destination RAID groups #10 to #12.

The prefetch control unit 125 performs a pre-read of a predetermined copy processing unit which should be written from the copy source RAID groups #0 to #2 to the copy destination RAID groups #10 to #12 on the basis of a copy session selected by the above described selection operation and the prescribed number of times. The prefetch control unit 125 inhibits the pre-read when the copy session is switched on the basis of the copy session selected by the selection operation and the prescribed number of times. In other words, the prefetch control unit 125 performs calculation of next prefetch target area and inhibition of prefetching next prefetch target area on the basis of the management contents of the above described RAID group management table 121 and copy session management table 122. The detailed operation of the prefetch control function of the copy control unit 12 will be described below with reference to FIG. 8.

The management tables 121,122, the monitoring unit 123, and the changing unit 124 may be included in both the copy source CM 10 and the copy destination CM 10. Or, the management tables 121,122, the monitoring unit 123, and the changing unit 124 may be included in either the copy source CM 10 or the copy destination CM 10, and may be shared by the copy source CM 10 or the copy destination CM 10. Further, when the copy destination CM 10 is only for data backup of the copy source CM 10, the prefetch control unit 125 may be included only in the copy source CM 10.

[2] Operation of the Embodiment

Next, an operation of the storage apparatus 1 configured as described above will be described with reference to FIGS. 6 to 11.

[2-1] Basic Copy Processing Function

Figure 6:
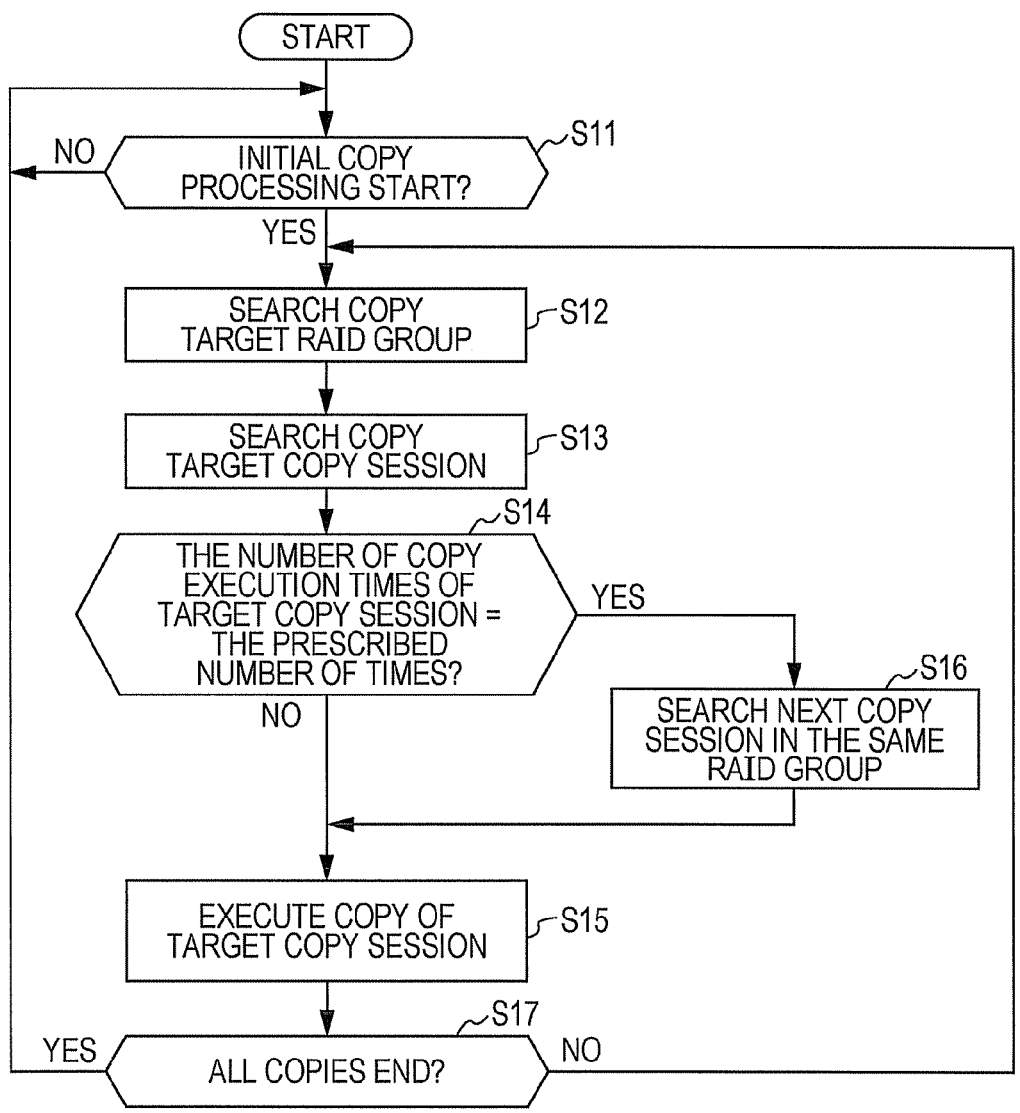
FIG. 6 is a flowchart for illustrating a basic copy processing function of the embodiment.
Figure 9:
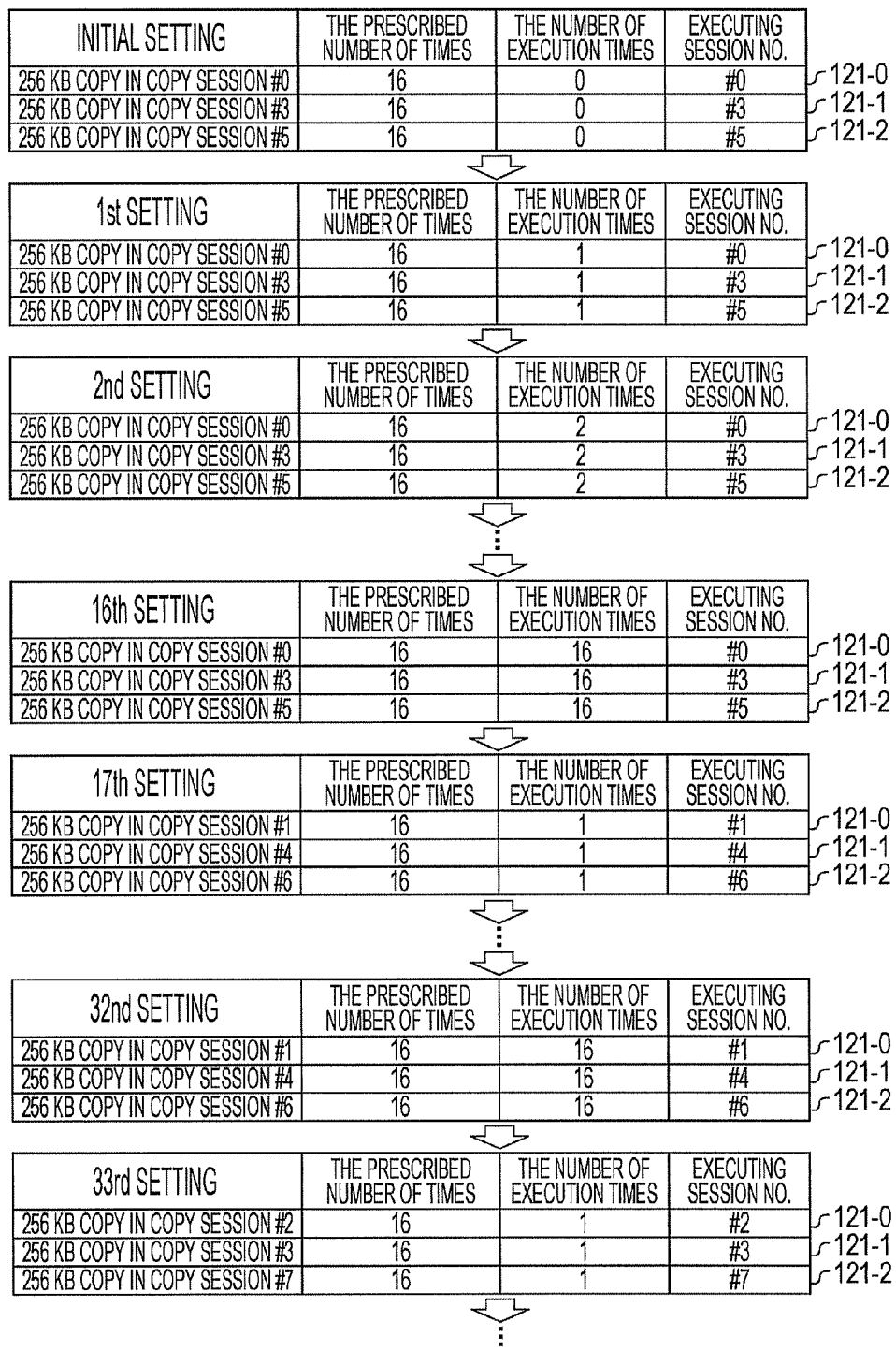
FIG. 9 is an illustration illustrating a copy operation and management contents of the RAID group management table of the embodiment.

First, the basic copy processing function of the copy control unit 12 will be described with reference to FIGS. 6, 9, and 11. Here, FIG. 6 is a flowchart for illustrating the basic copy processing function of the embodiment, and FIG. 9 is an illustration illustrating the copy operation and the management contents of the RAID group management tables 121 (121-0 to 121-2) of the embodiment. FIGS. 11A to 11S are illustrations illustrating the copy statuses of copying data to each copy destination logical volume corresponding to FIG. 9 for illustrating the copy processing of the embodiment.

Usually, in the initial copy, 10 GB, 100 GB, or greater amount of data is copied. Since such an amount of data cannot be handled at once, in this embodiment, the size of one initial copy (copy processing unit) is set to 256 Kbytes. Here, a case in which the number of copy processing repetition times (the prescribed number of times) is fixed to the default value of 16 will be described.

A basic copy processing procedure by the copy control unit 12 will be described in accordance with the flowchart illustrated in FIG. 6 (steps S11 to S17). When the initial copy starts (YES branch of step S11), the copy control unit 12 searches the copy target RAID group (step S12). Here, after the process starts, every time the process returns from NO branch of step S17 described below, one of the three sets of RAID groups, the RAID groups #0/#10, the RAID groups #1/#11, and the RAID groups #2/#12 are searched cyclically in this order (refer to "Loop" in FIG. 3).

The copy control unit 12 searches the copy target copy session by referring the "Copy executing session No." in the RAID group management table 121-0, 121-1 or 121-2 corresponding to the searched RAID group (step S13). At the beginning of the copy processing, the management tables 121-0 to 121-2 are set as illustrated in the "Initial setting" table of FIG. 9. Here, the "loop" unit a cyclic loop of the management tables 121-0 to 121-2 illustrated in FIG. 3.

More specifically, first, the RAID groups #0/#10 are searched (step S12), the management table 121-0 for the RAID groups #0/#10 is referred, and the copy session #0 is searched and selected (step S13). Whether the number of execution times "0" of the copy session #0 is the prescribed number of times 16 or not is determined (step S14). At this stage, off course, the number of execution times is not the prescribed number of times 16 (NO branch of step S14), so that the copy control unit 12 executes the copy processing of 256 Kbytes of data for the session #0 (step S15). At this time, the copy control unit 12 refers to the management table 122-0 for the copy session #0, identifies and reads the 256 Kbytes of data to be copied this time on the basis of the copy progress status and the copy source LUN, and transmits and writes the data to the copy destination logical volume corresponding to the copy destination LUN. The copy control unit 12 increments the "The number of execution times" in the management table 121-0 by 1 to "1". In this way, for example as illustrated in FIG. 11(A), the 256 Kbytes of data [A001] is copied for the copy session #0.

Thereafter, the copy control unit 12 determines whether all the copies are completed or not (step S17), and until determining that all the copies are completed (YES determination), the process returns to the processing of step S12 via the NO branch. When the process returns to steps S12, S13, the copy session #3 of the RAID groups #1/#11 is selected. For the copy session #3, the copy processing of 256 Kbytes of data is executed on the basis of the management table 122-3 (step S15), and "The number of execution times" in the management table 121-1 is incremented by 1. In this way, for example as illustrated in FIG. 11(B), the 256 Kbytes of data [A101] is copied for the copy session #3.

Thereafter, when the process returns to steps S12, S13, the copy session #5 of the RAID groups #2/#12 is selected. For the copy session #5, the copy processing of 256 Kbytes of data is executed on the basis of the management table 122-5 (step S15), and "The number of execution times" in the management table 121-2 is incremented by 1. In this way, for example as illustrated in FIG. 11(C), the 256 Kbytes of data [A201] is copied for the copy session #5. At this stage, the management tables 121-0 to 121-2 are set as illustrated in the "1st loop" table of FIG. 9.

In the 2nd loop, as illustrated in FIG. 11(D), data [A002] is copied for the copy session #0, as illustrated in FIG. 11(E), data [A102] is copied for the copy session #3, and as illustrated in FIG. 11(F), data [A202] is copied for the copy session #5. At this stage, the management tables 121-0 to 121-2 are set as illustrated in the "2nd loop" table of FIG. 9.

When such a loop is repeated 16 times, the management tables 121-0 to 121-2 are set as illustrated in the "16th loop" table of FIG. 9. At this stage, as illustrated in FIG. 11(G), continuous 16 data [A001] to [A016] are copied in the copy session #0, continuous 16 data [A101] to [A116] are copied in the copy session #3, and continuous 16 data [A201] to [A216] are copied in the copy session #5. In summary, the copy processing of the 256 Kbytes×16 of data is executed in a continuous area (neighboring areas) for the copy sessions #0, #3, and #5.

In this situation, when the process returns to steps S12, S13, the copy session #0 of the RAID groups #0/#10 is selected. However, YES determination occurs in step 14 since "The number of execution times" in the management table 121-0 is "16". Therefore, the copy control unit 12 searches and selects next copy session #1 in the same RAID groups #0/#10 (step S16). At this time, the copy control unit 12 rewrites "Executing session No." in the management table 121-0 from "#0" to "#1", and resets the "The number of execution times" to "0". For the copy session #1, the copy processing of 256 Kbytes of data is executed on the basis of the management table 122-1 (step S15), and "The number of copy execution times" in the management table 121-0 is incremented by 1. In this way, for example as illustrated in FIG. 11(H), the 256 Kbytes of data [B001] is copied for the copy session #1.

Thereafter, when the process returns to steps S12, S13, the copy session #3 of the RAID groups #1/#11 is selected. However, YES determination occurs in step 14 since "The number of execution times" in the management table 121-1 is "16", and the next copy session #4 in the same RAID groups #1/#11 is searched and selected (step S16). At this time, the copy control unit 12 rewrites "Executing session No." in the management table 121-1 from "#3" to "#4", and resets the "The number of execution times" to "0". For the copy session #4, the copy processing of 256 Kbytes of data is executed on the basis of the management table 122-4 (step S15), and "The number of copy execution times" in the management table 121-1 is incremented by 1. In this way, for example as illustrated in FIG. 11(I), the 256 Kbytes of data [B101] is copied for the copy session #4.

Thereafter, when the process returns to steps S12, S13, the copy session #5 of the RAID groups #2/#12 is selected. However, YES determination occurs in step 14 since "The number of execution times" in the management table 121-2 is "16", and the next copy session #6 in the same RAID groups #2/#12 is searched and selected (step S16). At this time, the copy control unit 12 rewrites "Executing session No." in the management table 121-2 from "#5" to "#6", and resets the "The number of execution times" to "0". For the copy session #6, the copy processing of 256 Kbytes of data is executed on the basis of the management table 122-6 (step S15), and "The number of copy execution times" in the management table 121-2 is incremented by 1. In this way, for example as illustrated in FIG. 11(J), the 256 Kbytes of data [B201] is copied for the copy session #6. At this stage, the management tables 121-0 to 121-2 are set as illustrated in the "17th loop" table of FIG. 9.

In the 18th loop, as illustrated in FIG. 11(K), data [B002] is copied for the copy session #1, as illustrated in FIG. 11(L), data [B102] is copied for the copy session #4, and as illustrated in FIG. 11(M), data [B202] is copied for the copy session #6.

When the same processing is repeated and the 32nd loop is completed, the management tables 121-0 to 121-2 are set as illustrated in the "32nd loop" table of FIG. 9. At this stage, as illustrated in FIG. 11(N), the continuous 16 data [A001] to [A016] are copied in the copy session #0, and the continuous 16 data [B001] to [B016] are copied in the copy session #1. Also, the continuous 16 data [A101] to [A116] are copied in the copy session #3, and the continuous 16 data [B101] to [B116] are copied in the copy session #4. Further, the continuous 16 data [A201] to [A216] are copied in the copy session #5, and the continuous 16 data [B201] to [B216] are copied in the copy session #6.

In this situation, when the process returns to steps S12, S13, the copy session #1 of the RAID groups #0/#10 is selected. However, YES determination occurs in step 14 since "The number of execution times" in the management table 121-0 is "16". Therefore, the copy control unit 12 searches and selects next copy session #2 in the same RAID groups #0/#10 (step S16). At this time, the copy control unit 12 rewrites "Executing session No." in the management table 121-0 from "#1" to "#2", and resets the "The number of execution times" to "0". For the copy session #2, the copy processing of 256 Kbytes of data is executed on the basis of the management table 122-2 (step S15), and "The number of copy execution times" in the management table 121-0 is incremented by 1. In this way, for example as illustrated in FIG. 11(O), the 256 Kbytes of data [C001] is copied for the copy session #2.

Thereafter, when the process returns to steps S12, S13, the copy session #4 of the RAID groups #1/#11 is selected. However, YES determination occurs in step 14 since "The number of execution times" in the management table 121-1 is "16", and the next copy session #3 in the same RAID groups #1/#11 is searched and selected (step S16). At this time, the copy control unit 12 rewrites "Executing session No." in the management table 121-1 from "#4" to "#3", and resets the "The number of execution times" to "0". For the copy session #3, the copy processing of 256 Kbytes of data is executed on the basis of the management table 122-3 (step S15), and "The number of copy execution times" in the management table 121-1 is incremented by 1. In this way, for example as illustrated in FIG. 11(P), the 256 Kbytes of data [A117] is copied for the copy session #3.

Thereafter, when the process returns to steps S12, S13, the copy session #6 of the RAID groups #2/#12 is selected. However, YES determination occurs in step 14 since "The number of execution times" in the management table 121-2 is "16", and the next copy session #7 in the same RAID groups #2/#12 is searched and selected (step S16). At this time, the copy control unit 12 rewrites "Executing session No." in the management table 121-2 from "#6" to "#7", and resets the "The number of execution times" to "0". For the copy session #7, the copy processing of 256 Kbytes of data is executed on the basis of the management table 122-7 (step S15), and "The number of copy execution times" in the management table 121-2 is incremented by 1. In this way, for example as illustrated in FIG. 11(Q), the 256 Kbytes of data [C201] is copied for the copy session #7. At this stage, the management tables 121-0 to 121-2 are set as illustrated in the "33rd loop" table of FIG. 9.

At a stage in which the same processing is repeated and the 48th loop is completed, as illustrated in FIG. 11(R), the continuous 16 data [A001] to [A016] are copied in the copy session #0, the continuous 16 data [B001] to [B016] are copied in the copy session #1, and the continuous 16 data [C001] to [C016] are copied in the copy session #2. Also, the continuous 32 data [A101] to [A132] are copied in the copy session #3, and the continuous 16 data [B101] to [B116] are copied in the copy session #4. Further, the continuous 16 data [A201] to [A216] are copied in the copy session #5, the continuous 16 data [B201] to [B216] are copied in the copy session #6, and the continuous 16 data [C201] to [C216] are copied in the copy session #7.

Furthermore, at the stage when the 64th loop is completed, as illustrated in FIG. 11(S), the continuous 32 data [A001] to [A032] are copied in the copy session #0, the continuous 16 data [B001] to [B016] are copied in the copy session #1, and the continuous 16 data [C001] to [C016] are copied in the copy session #2. The continuous 32 data [A101] to [A132] are copied in the copy session #3, and the continuous 32 data [B101] to [B132] are copied in the copy session #4. Further, the continuous 32 data [A201] to [A232] are copied in the copy session #5, the continuous 16 data [B201] to [B216] are copied in the copy session #6, and the continuous 16 data [C201] to [C216] are copied in the copy session #7.

The operations of the basic copy processing function described with reference to FIGS. 6, 9, and 11 are summarized by itemization as follows.

[1] For the copy session #0, 256 Kbytes of data is copied once.

[2] For the copy session #3, 256 Kbytes of data is copied once.

[3] For the copy session #5, 256 Kbytes of data is copied once.

[4] Operations [1] to [3] are repeated 16 times.

[5] For the copy session #1, 256 Kbytes of data is copied once.

[6] For the copy session #4, 256 Kbytes of data is copied once.

[7] For the copy session #6, 256 Kbytes of data is copied once.

[8] Operations [5] to [7] are repeated 16 times.

[9] For the copy session #2, 256 Kbytes of data is copied once.

[10] For the copy session #3, 256 Kbytes of data is copied once.

[11] For the copy session #7, 256 Kbytes of data is copied once.

[12] Operations [9] to [11] are repeated 16 times.

[13] For the copy session #0, 256 Kbytes of data is copied once.

[14] For the copy session #4, 256 Kbytes of data is copied once.

[15] For the copy session #5, 256 Kbytes of data is copied once.

[16] Operations [13] to [15] are repeated 16 times.

The situation when the above item [4] is completed corresponds to the "16th loop" table of FIG. 9 and FIG. 11(G), and the situation when the above item [8] is completed corresponds to the "32nd loop" table of FIG. 9 and FIG. 11(N). The situation when the above item [12] is completed corresponds to FIG. 11(R), and the situation when the above item [16] is completed corresponds to FIG. 11(S).

As described above, by devising scheduling algorithms of the copy processing of the copy sessions #0 to #7 to perform the copy processing, data can be read/write from/to a continuous area (neighboring areas) as much as possible. Therefore, the head movement on the physical disk decreases, so that an improvement of the usage efficiency of the disk groups, in other words, an improvement of the throughput of the entire apparatus is realized.

[2-2] Changing Function of the Prescribed Number of Times

Next, the changing function of the prescribed number of times by the copy control unit 12 will be described with reference to FIGS. 7 and 10. Here, FIG. 7 is a flowchart for illustrating the changing function (procedure for changing a predetermined number of execution times of the copy processing) of the embodiment, and FIG. 10 is an illustration illustrating the copy operation and the management contents of the RAID group management tables 121 (121-0 to 121-2) of the embodiment.

Figure 12:
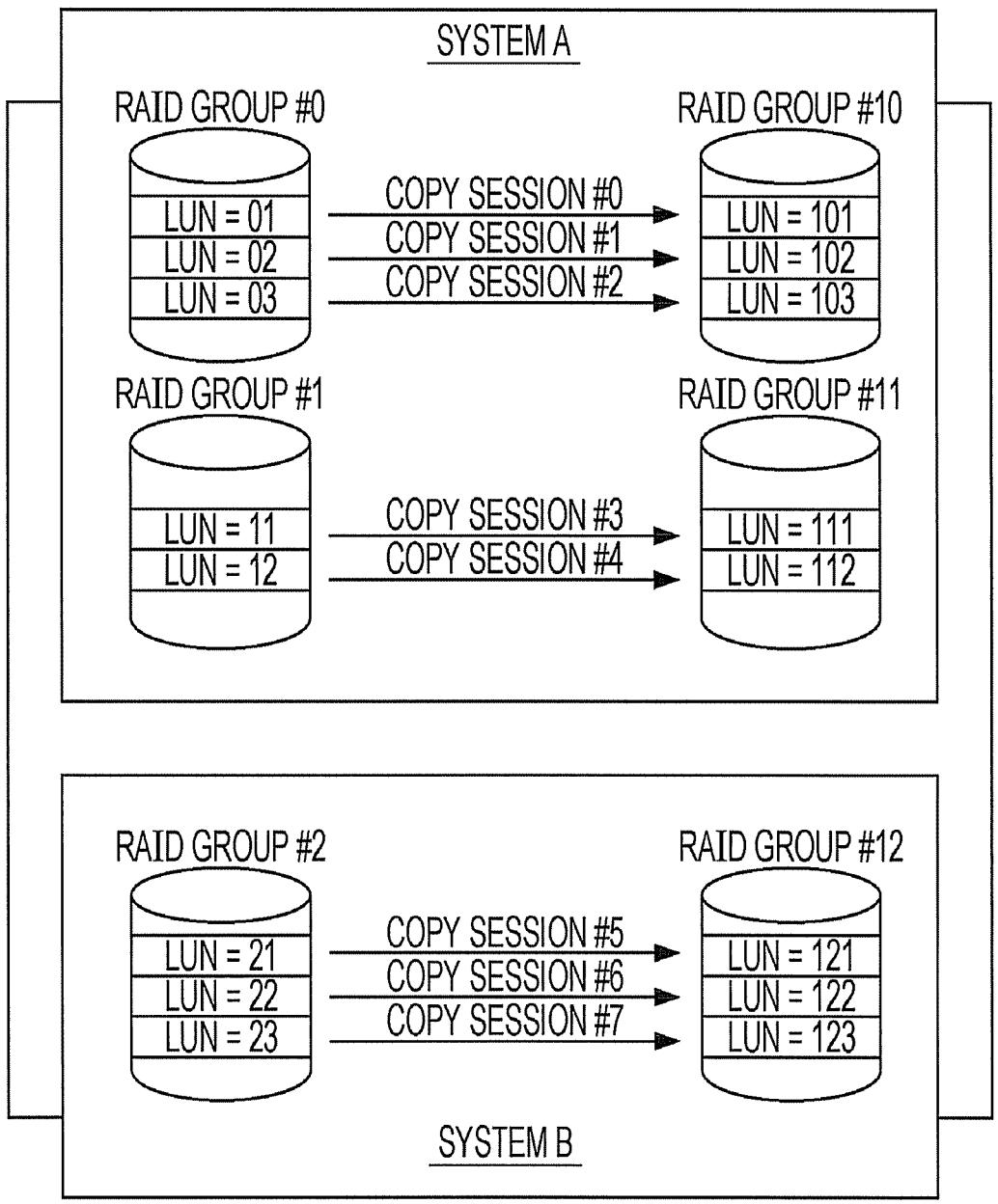
FIG. 12 is an illustration schematically illustrating an example case in which a plurality of copy sessions conflict with each other in a general storage apparatus.

Generally, the RAID groups used in the storage apparatus 1 may include various types of disks, and as illustrated in FIG. 12 for example, the processing speed of the RAID group #12 for the system B is assumed to be extremely low. In this case, the copy processing of the third copy session group (three sessions #5 to #7) is extremely slow, so that the RAID groups #10 and #11 for the system A are in a wait state while the copy processing by the three sessions #5 to #7 is being executed. In other words, being dragged by the slow processing of the RAID group #12 for the system B, the copy processing in the RAID groups #10 and #11 for the system A also becomes slow. As described above, such a situation is often noticeable in the copy destination RAID groups. To cope with such a case, in this embodiment, the changing function for changing the prescribed number of times by the copy control unit 12 is used in order to improve the performance of copy processing.

The changing procedure for changing the prescribed number of times by the copy control unit 12 will be described in accordance with the flowchart illustrated in FIG. 7 (steps S21 to S29). First, the copy control unit 12 sets the default value of, for example, 16, as the number of copy processing repetition times (the prescribed number of times) in each copy session (step S21). Thereafter, when the copy processing is executed by the procedure described with reference to FIG. 6 (YES branch of step S22), the processing of steps S23 to S29 is performed. Here, as a criterion for determining YES in step 22, for example, a case in which the copy processing in each copy session is repeated a predetermined number of times or the like is considered.

When YES determination occurs in step S22, the write response time (the above described response time) of the copy destination RAID groups #10 to #12 is monitored and detected by the monitoring unit 123 for each copy session. The changing unit 124 determines whether or not the detected response time is smaller than the first predetermined value (step S23).

When the response time is smaller than the first predetermined value (YES branch of step S23), if the prescribed number of times can be decreased (in other words, current prescribed number of times is not 4; YES branch of step S24), the changing unit 124 decreases the prescribed number of times by one step (step S25). In other words, for example, if the current prescribed number of times is 16, it is decreased to 8. On the other hand, if the prescribed number of times cannot be decreased (in other words, if the current prescribed number of times is 4; NO branch of step S24), the changing unit 124 skips the processing of step S25 to return to the processing of step S22, so that the prescribed number of times is kept at 4.

When the response time is greater than or equal to the first predetermined value (NO branch of step S23), the changing unit 124 determines whether or not the response time is greater than the second predetermined value (>=the first predetermined value) (step S26). When the response time=the first predetermined value=the second predetermined value, or the response time is between the first predetermined value and the second predetermined value (NO branch of step S26), the changing unit 124 keeps the current prescribed number of times.

When the response time is greater than the second predetermined value (YES branch of step S26), if the prescribed number of times can be increased (in other words, current prescribed number of times is not 64; YES branch of step S27), the changing unit 124 increases the prescribed number of times by one step (step S28). In other words, for example, if the current prescribed number of times is 16, it is increased to 32. On the other hand, if the prescribed number of times cannot be increased (in other words, if the current prescribed number of times is 64: NO branch of step S27), the changing unit 124 skips the copy processing of the current copy session for a predetermined time period, and resumes the copy processing automatically after a predetermined time has passed (step S29).

Figure 10:
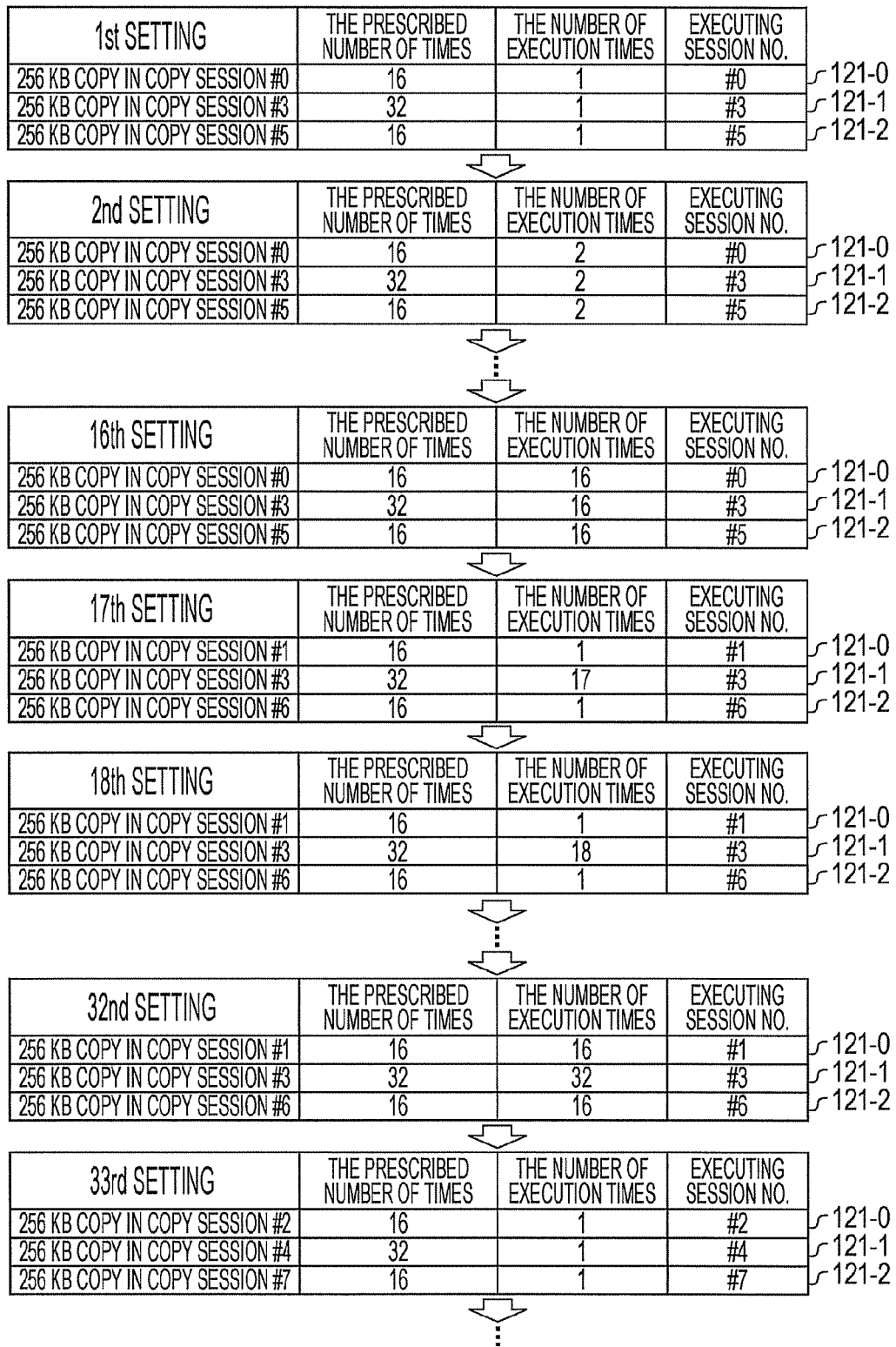
FIG. 10 is an illustration illustrating a copy operation and management contents of the RAID group management table of the embodiment.

An example of copy operation in which, for example as in the above described procedure, the prescribed number of times of the copy sessions #3 and #4 is increased from 16 to 32 because the response time in the RAID groups #1/#10 is smaller than the first predetermined value is illustrated in FIG. 10. Even when the prescribed number of times for the copy sessions #3 and #4 managed by the management table 121-1 is different from the prescribed number of times for the other copy sessions as mentioned above, the copy processing is executed in accordance with the flowchart illustrated in FIG. 6 as described above. In this way, as illustrated in FIG. 10, while the copy processing of the copy sessions #3, #4 is executed 32 times, a set of copy processing executed 16 times is executed 2 times in the other copy sessions.

By dynamically selecting and changing the prescribed number of times (the number of copy processing repetition times) depending on the response time on the basis of the default value, the operational advantages as described below are obtained. When the response time is smaller than the first predetermined value and copy processing performance is good, the changing unit 124 decreases the predetermined number of times by one step, determining that the RAID group on which the copy session is performed has enough performance. In this way, although, in the RAID group for which the prescribed number of times is decreased, the head movement amount on the physical disk increases compared with before the decrease of the prescribed number of times, the increase of the movement amount is not a problem because the RAID group has enough performance. On the contrary, loads are averaged between the copy sessions of the RAID group and the copy sessions of the other RAID groups, so that concentration of the processing to a certain copy session can be avoided.

On the other hand, when the response time is greater than the second predetermined value and copy processing performance is bad, the changing unit 124 increases the prescribed number of times by one step. In this way, a data read/write amount from/to a continuous area (neighboring areas) on the same physical disk increases, so that the copy processing performance improves.

However, there is a limitation in improving performance by increasing the prescribed number of times, and the response time may not be improved even when increasing the prescribed number of times to the maximum value of 64. Therefore, when the response performance is not smaller than the first predetermined value even when the changing unit 124 increases the predetermined number of times to 64, the changing unit 124 causes the copy processing of the copy session to skip for a predetermined time period, determining that the load on the copy session (RAID group) is high. In this way, it is possible to prevent a case in which, being dragged by the slow processing of the RAID group #12 for the system B, the copy processing in the RAID groups #10 and #11 for the system A becomes slow as described above with reference to FIG. 12.

[2-3] Prefetch Control Function

Figure 8:
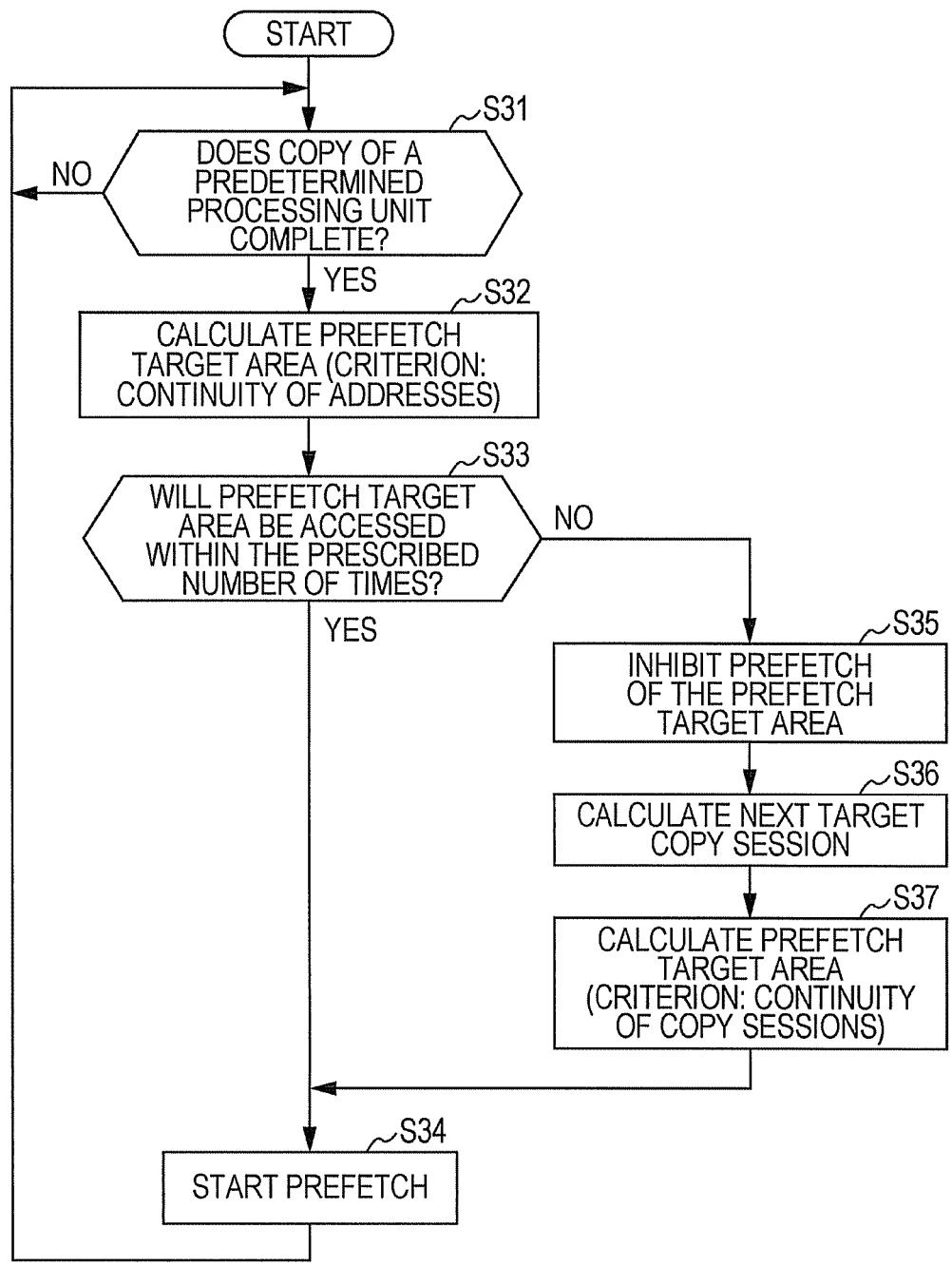
FIG. 8 is a flowchart for illustrating a prefetch control function in a copy source RAID group of the embodiment.

Next, the prefetch control function in the copy source RAID groups #0 to #2 by the copy control unit 12 of the embodiment will be described in accordance with the flowchart illustrated in FIG. 8 (steps S31 to S37).

In each copy session, every time the copy processing of a predetermined copy processing unit (step S15 in FIG. 6) is completed (YES branch of step S31), the prefetch control unit 125 performs the processing of steps S32 to S37. Specifically, the prefetch control unit 125, first, refers to the RAID management table 121 to identify a copy session in copy execution. Thereafter, the prefetch control unit 125 calculates the address of prefetch target area to be pre-read in accordance with the continuity of addresses on the basis of the copy progress status and the copy source LUN in the management table 122-$j$ ($j$=0 to 7) corresponding to the identified copy session (step S32).

Thereafter, the prefetch control unit 125 determines whether or not the prefetch target area can be accessed within a preset number of copy repetition times (the prescribed number of times) (step S33). For example, when 16 is set as the prescribed number of times, it is determined whether or not the prefetch target area is between the 1st and 16th copy processing targets. When the prefetch target area is between the 1st and 16th copy processing targets (YES branch of step S33), the prefetch control unit 125 starts the prefetch of the prefetch target area (step S34), and returns to the processing of step S31.

On the other hand, when the prefetch target area is a copy target area which needs to be accessed more than the prescribed number of times (for example, 16 times) (NO branch of step S33), the prefetch control unit 125 inhibits the prefetch of the prefetch target area (step S35). The prefetch control unit 125 refers to the RAID management table 121 to calculate and identify the next copy session (step S36). Thereafter, the prefetch control unit 125 calculates the address of prefetch target area to be pre-read in accordance with the continuity of copy sessions on the basis of the copy progress status and the copy source LUN in the management table 122-$j$ ($j$=0 to 7) corresponding to the identified copy session (step S37). The prefetch control unit 125 starts the prefetch of the prefetch target area (step S34), and returns to the processing of step S31.

As described above, in the storage apparatus 1 (CM 10), the next target area on which the copy processing is executed can be known in advance on the basis of the RAID management table 121 and the copy session management table 122. Therefore, by referring the RAID management table 121 and the copy session management table 122, the prefetch control unit 125 can calculate the address of the prefetch target area and determine whether the prefetch target area is a copy processing target which is copied within the prescribed number of times.

When the copy session is switched, a usual prefetch control cannot perform prefetch because the continuity of the addresses is lost. However, in this embodiment, the prefetch target area after switching copy session can be calculated on the basis of the RAID management table 121 and the copy session management table 122, so that prefetch is always possible. When the prefetch target area is an area which needs to be accessed more than the prescribed number of times, the prefetch of the prefetch target area is prevented, so that a useless prefetch execution is surely prevented.

[3] Advantages of the Embodiment

As described above, according to the storage apparatus 1 (CM 10) of the embodiment, a copy session is cyclically selected from each of the first to the third copy session groups in a predetermined sequence. The copy processing on a predetermined copy processing unit basis for the selected 3 copy sessions is executed cyclically in a predetermined sequence for the prescribed number of times. By repeatedly performing such a selection operation and control operation, the copy processing is equally executed for the 3 RAID groups #10, #11, and #12, and continuous accesses to the same physical disk in the same RAID group for the prescribed number of times are possible. In this way, the head movement amount on the physical disk decreases, and data is written/read to/from a continuous area or neighboring areas on the same disk, so that the usage efficiency of the RAID group is significantly improved.

According to the storage apparatus 1 (CM 10) of the embodiment, by dynamically selecting and changing the prescribed number of times (the number of copy processing repetition times) depending on the response time, the copy processing is equally scheduled for all the copy sessions #0 to #7. For example, when the copy processing performance is good, by decreasing the prescribed number of times, loads are averaged in the RAID groups #10 to #12 (the copy sessions #0 to #7), so that concentration of the processing to a certain copy session can be avoided. On the other hand, when the copy processing performance is bad, by decreasing the prescribed number of times, a data read/write amount from/to a continuous area (neighboring areas) on the same physical disk increases, so that the copy processing performance improves. When the response performance is not improved even when the prescribed number of times is increased to the maximum value, the copy processing of the copy session is skipped for a predetermined time period, determining that the load on the copy session (RAID group) is high. In this way, it is possible to prevent a case in which a copy session of a high-speed processing RAID group is dragged by a copy session of a low-speed processing RAID group and the copy processing becomes slow can be surely prevented.

Furthermore, according to the storage apparatus 1 (CM 10) of the embodiment, since the continuous accesses are possible as described above, a pre-read (prefetch) can be performed when reading data in the copy processing in a copy source disk group, so that the read performance of the copy source disk group is significantly improved. At this time, in the storage apparatus 1 (CM 10) of the embodiment, even if the continuity of addresses is lost due to the switching of the copy session, the prefetch target area after the switching of the copy session can be calculated, so that prefetch is always possible. Therefore, efficient copy processing can be always executed. When the prefetch target area is an area which needs to be accessed more than the prescribed number of times, the prefetch of the prefetch target area is prevented. Therefore, a useless prefetch execution is surely prevented, and an efficient prefetch operation can be realized in the copy source RAID group.

[4] Others

The present technique is not limited to the above described embodiment, and various modifications may be implemented without departing from the scope of the technique. For example, although, in the above described embodiment, a case in which the storage apparatus 1 includes 2 CMs 10 and 4 storages 30, and 8 copy sessions #0 to #7 belonged to 3 copy session groups are executed is described, the present technique is not limited to this. Also, although, in the above described embodiment, a case in which the prescribed number of times includes 5 steps of 4, 8, 16, 32, and 64, and the default value is 16 is described, the present technique is not limited to this.

All or part of the function of the copy control unit 12 (the RAID group management table 121, the copy session management table 122, the monitoring unit 123, the changing unit 124, and the prefetch control unit 125) is realized by executing a predetermined application program (storage control program) by a computer including a CPU information processing unit and various terminals.

The program is provided as a computer-readable recording medium such as, for example, a flexible disk, CD (CD-ROM, CD-R, CD-RW, and the like), DVD (DVD-ROM, DVD-RAM, DVD-R, DVD-RW, DVD+R, DVD+RW, Blu-ray Disc, and the like), and the like, in which the program is recorded. In this case, the computer reads the program from the recording medium, and transmits and stores the program into an internal storage apparatus or an external storage apparatus to use the program. Or, the program may be recorded in a storage apparatus (recording medium) such as, for example, a magnetic disk, an optical disk, an optical magnetic disk, and the like, and provided from the storage apparatus to the computer via a communication line.

Here, the computer is a concept including hardware and an OS, and the computer unit the hardware which operates under a control of the OS. When the OS is not required, and the application program independently operates the hardware, the hardware itself corresponds to the computer. The hardware includes at least a microprocessor such as a CPU, and a unit for reading a computer program recorded in a recording medium. The program includes program codes for causing the computer as described above to realize the function of the copy control unit 12 (the RAID group management table 121, the copy session management table 122, the monitoring unit 123, the changing unit 124, and the prefetch control unit 125). A part of the function may be realized by the OS instead of the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage apparatus comprising:
a first to an Mth (M is an integer of two or more) copy source disk groups, each of the copy source disk groups including one or more copy source physical disks;
a first to an Mth copy destination disk groups respectively corresponding to the first to the Mth copy source disk groups, each of the copy destination disk groups including one or more copy destination physical disks; and
a copy control unit to manage a copy session for copying a copy source data area in at least one of the first to the Mth copy source disk groups to a copy destination data area in a corresponding copy destination disk group, to set a first to an Mth copy session groups, each of the copy session groups including one or more copy sessions from the ith (i=1, 2, . . . , M) copy source disk group to the ith copy destination disk group as the copy session, and to perform repeatedly a selection operation to cyclically select a copy session from each of the first to the Mth copy session groups in a predetermined sequence and a control operation to cyclically execute copy processing on a predetermined copy processing unit basis for the M copy sessions selected by the selection operation in a predetermined sequence for a prescribed number of times,
wherein the copy control unit includes:
a monitoring unit to monitor a write response time of the copy destination disk group in the copy processing by the control operation for each copy session, and
a changing unit to dynamically change the prescribed number of times of each copy session depending on the write response time monitored by the monitoring unit.

2. The storage apparatus described in claim 1, wherein the changing unit of the copy control unit decreases the prescribed number of times when the write response time is smaller than a predetermined value.

3. The storage apparatus described in claim 1, wherein the changing unit of the copy control unit increases the prescribed number of times when the write response time is greater than a predetermined value.

4. The storage apparatus described in claim 3, wherein the changing unit of the copy control unit skips for a predetermined time the copy processing of a copy session in which the write response time is not improved even when the prescribed number of times is increased.

5. The storage apparatus described in claim 1, further comprising a prefetch control unit to perform a pre-read of the predetermined copy processing unit of data which should be written from the copy source disk group to the copy destination disk group on the basis of the copy session selected by the selection operation and the prescribed number of times.

6. The storage apparatus described in claim 5, wherein the prefetch control unit of the copy control unit inhibits the pre-read when the copy session is switched on the basis of the copy session selected by the selection operation and the prescribed number of times.

7. The storage apparatus described in claim 1, further comprising:
a disk group management table for managing information identifying a copy session in which the copy processing is being executed, a number of execution times of the copy processing for the copy session, and the prescribed number of times of the copy processing for the copy session, for each copy destination disk group and copy source disk group; and a copy session management table for managing information identifying the copy source data area, information identifying the copy destination data area, and progress status of the copy processing;

wherein the copy control unit performs the selection operation on the basis of the disk group management table, and performs the control operation on the basis of the copy session management table.

8. A storage control apparatus for controlling a first to an Mth (M is an integer of two or more) copy source disk groups, each of the copy source disk groups including one or more copy source physical disks and a first to an Mth copy destination disk groups respectively corresponding to the first to the Mth copy source disk groups, each of the copy destination disk groups including one or more copy destination physical disks, the storage control apparatus comprising:

a copy control unit to manage a copy session for copying a copy source data area in at least one of the first to the Mth copy source disk groups to a copy destination data area in a corresponding copy destination disk group, to set a first to an Mth copy session groups, each of the copy session groups including one or more copy sessions from the ith (i=1, 2, . . . M) copy source disk group to the ith copy destination disk group as the copy session, and to perform repeatedly a selection operation to cyclically select a copy session from each of the first to the Mth copy session groups in a predetermined sequence and a control operation to cyclically execute copy processing on a predetermined copy processing unit basis for the M copy sessions selected by the selection operation in a predetermined sequence for a prescribed number of times, wherein the copy control unit includes:

a monitoring unit to monitor a write response time of the copy destination disk group in the copy processing by the control operation for each copy session, and a changing unit to dynamically change the prescribed number of times of each copy session depending on the write response time monitored by the monitoring unit.

9. The storage control apparatus described in the claim 8, wherein the changing unit of the copy control unit decreases the prescribed number of times when the write response time is smaller than a predetermined value.

10. The storage control apparatus described in claim 8, wherein the changing unit of the copy control unit increases the prescribed number of times when the write response time is greater than a predetermined value.

11. The storage control apparatus described in claim 10, wherein the changing unit of the copy control unit causes a copy session in which the write response time is not improved even when the prescribed number of times is increased to skip the copy processing for a predetermined time period.

12. The storage control apparatus described in claim 8, further comprising a prefetch control unit to perform a pre-read of the predetermined copy processing unit of data which should be written from the copy source disk group to the copy destination disk group on the basis of the copy session selected by the selection operation and the prescribed number of times.

13. The storage control apparatus described in claim 12, wherein the prefetch control unit of the copy control unit inhibits the pre-read when the copy session is switched on the basis of the copy session selected by the selection operation and the prescribed number of times.

14. The storage control apparatus described in claim 8, further comprising:

a disk group management table for managing information identifying a copy session in which the copy processing is being executed, a number of execution times of the copy processing for the copy session, and the prescribed number of times, for each copy destination disk group and copy source disk group; and a copy session management table for managing information identifying the copy source data area, information identifying the copy destination data area, and progress status of the copy processing;

wherein the copy control unit performs the selection operation on the basis of the disk group management table, and performs the control operation on the basis of the copy session management table.

15. A computer readable storage medium storing a storage control program for causing a computer to execute:

in a storage apparatus including a first to an Mth (M is an integer of two or more) copy source disk groups, each of which includes one or more copy source physical disks, and a first to an Mth copy destination disk groups, each of which includes one or more copy destination physical disks, respectively corresponding to the first to the Mth copy source disk groups, a copy session which copies an copy source data area in at least one of the first to the Mth copy source disk groups to a copy destination data area in a corresponding copy destination disk group, setting a first to an Mth copy session groups are set, each of which includes one or more copy sessions from the ith (i=1, 2, . . . , M) copy source disk group to the ith copy destination disk group as the above mentioned copy session, performing repeatedly a selection operation to cyclically select a copy session from each of the first to the Mth copy session groups in a predetermined sequence, and a control operation to cyclically execute copy processing on a predetermined copy processing unit basis for the M copy sessions selected by the selection operation in a predetermined sequence for a prescribed number of times, monitoring a write response time of the copy destination disk group in the copy processing by the control operation for each copy session, and dynamically changing the prescribed number of times of each copy session depending on the monitored write response time.

* * * * *

UNITED STATES PATENT AND TRADEMARK OFFICE
CERTIFICATE OF CORRECTION

PATENT NO. : 8,438,350 B2  
APPLICATION NO. : 12/633864  
DATED : May 7, 2013  
INVENTOR(S) : Hidenori Yamada et al.

Page 1 of 1

It is certified that error appears in the above-identified patent and that said Letters Patent is hereby corrected as shown below:

In the Claims:

Column 19, Line 45, In Claim 9, after "in" delete "the".

Signed and Sealed this  
Twenty-seventh Day of August, 2013

Teresa Stanek Rea  
*Acting Director of the United States Patent and Trademark Office*